UNITED STATES PATENT OFFICE.

EDWARD GOODRICH ACHESON, OF BUFFALO, NEW YORK.

METHOD OF MANUFACTURING GRAPHITE.

SPECIFICATION forming part of Letters Patent No. 645,285, dated March 13, 1900.

Application filed September 30, 1899. Serial No. 732,202. (No specimens.)

*To all whom it may concern:*

Be it known that I, EDWARD GOODRICH ACHESON, a citizen of the United States, residing at Buffalo, in the county of Erie and State of New York, have invented certain new and useful Improvements in the Methods of Manufacturing Graphite, of which the following is a specification.

In my prior patent, No. 568,323, in which I claim, broadly, the manufacture of graphite by decomposition of a carbid, and to which my present invention is subordinate, I describe particularly the treatment of carbonaceous materials containing sufficient impurities that will make chemical compounds therewith to initially form true fixed carbids of all the contained carbon not utilized in the reduction of the oxids of the impurities, and where the amount of impurities in the original carbonaceous material is not sufficient to fix all of the carbon in a true carbid additional impurities are added thereto, and where a carbonaceous material contains an excess of these impurities a material rich in carbon is added in order that the proper proportions may be established, the object being to operate upon a mixture of approximately theoretical chemical composition for the initial formation of carbids of the carbon and the associated impurities, and the process further provides that the carbon in the carbids thus formed is disassociated or separated therefrom into the graphitic form, while the other elements of the carbid are volatilized. Thus it will be seen that the process primarily provides for the formation of carbids of all, or approximately all, of the material operated upon not disposed of in the reduction of the metallic oxids prior to the liberation of the carbon in the graphitic state, and this necessitates the presence of practically the theoretical proportion of silicon or other element forming the carbid, as illustrated in the patent specification, taking, for example, fifty parts, by weight, of coke and fifty parts, by weight, of silica, the excess in carbon being intended to combine with the oxygen of the silica, the theoretical proportions being approximately thirty parts of carbon and seventy parts of silicon.

In my Patent No. 617,979 I have described and claimed the method of manufacturing articles containing a desired amount of graphite, in which I made use of amorphous carbon mixed with some material capable of combining with the carbon and to which is added a proper binding material, and the article was then molded from the mixture and subjected to a temperature sufficiently high and for sufficient length of time and under such conditions as to cause more or less of the carbon in the article to be converted into graphite.

In carrying out this process I described the use of amorphous carbon, and to this carbon I added impurities capable of chemically combining therewith in such amount as found necessary for the production of the desired amount of graphite, and the process further provides for the chemical association of the impurities with successive portions of the carbon in a progressive manner and the conversion of more or less of the carbon into graphite, the amount of graphite produced in the article by the process depending upon the character of the original amorphous carbon and the character and amount of impurities added therewith. I have discovered that the amount of graphite produced in such articles by progressive formation and decomposition of the carbids further depends upon the degree of perfection of the intermingling of the carbon and the associated impurities, so that even under the best attainable artificial mixing or distributing the action would be more or less irregular and incomplete. I have further discovered that a higher degree of perfection in making graphite by the progressive action above described can be obtained by employing certain carbonaceous materials wherein the impurities are naturally and inherently distributed and which afford the necessary conditions for the formation of graphite from the contained carbon, in that the character, quantity, and natural and inherent distribution of the associated impurities are such as to produce better results than I have been able to obtain by artificial mixtures, and, moreover, I have discovered that a comparatively small percentage of such naturally-distributed and inherent impurities will produce a practically-complete conversion of the carbon not lost in the volatile chemical products, owing to the accurate or even natural distribution of the impurities throughout the body of carbonaceous material. Thus I have found that an anthracite coal which contains 5.783 per cent. of ash, consisting largely of silica, alumina, and iron oxids, is converted into a practically-pure graphite by treatment under my process hereinbefore described and that the contained ash is found by analysis to have been reduced to 0.033 per cent. I have also discovered that use can be made of carbonaceous material in general which (like anthracite coal) contains in the respective pieces or particles thereof, of whatever size or fineness of subdivision, less carbid-forming impurities than will convert the whole of said pieces or particles respectively into fixed carbid. Thus use can be made, for instance, of lignite, peat, other non-caking coals, some forms of wood or the charcoals produced therefrom and containing a sufficient percentage of ash, such as willow, and all those carbonaceous materials containing a substantially-uniform natural distribution of impurities capable of forming carbids and that may be charred in the natural state without destroying the relative positions of the carbon and associated impurities as distinguished, for example, from a caking bituminous coal in which the metallic oxids tend to settle into the lower layers, producing an uneven distribution when such coal is subjected to heat.

My present invention is based upon said discoveries and relates to a process of producing graphite, its object being to produce graphite cheaply and in a practically-pure state; and it consists, briefly stated, in the method of procedure substantially as hereinafter more particularly set forth and claimed, whereby pieces or particles of certain carbonaceous materials—such as anthracite coal, other non-caking coal, willow-charcoal, and others, as specified—are converted into graphite in a practically-uniform condition throughout.

As illustrative of the carrying out of my present invention, I take anthracite coal of any desired size, or by preference I take the refuse coal, which is known as "anthracite culm," and subject it to a sufficiently-high temperature for a sufficient length of time to effect the volatilization of the impurities. A reaction occurs, however, prior to the volatilization of the impurities between them and the associated carbon, the formation and destruction of a carbid or carbids—such, for instance, as carbid of silicon or carbid of iron; but, as heretofore explained, the amount of impurities not being sufficient to form a carbid of all the carbon at one and the same time a catalytic or progressive action occurs. Owing to the fact that in these carbonaceous materials the distribution of the impurities is natural and practically uniform, a catalytic action is facilitated and practically all of the carbon can be converted into the graphitic form before the final volatilization and escape of the impurities, and this even although a relatively-small amount of impurities is present.

In practically carrying out this process I have made use of an electric furnace in which the materials are protected from atmospheric influences and in which the materials can be heated to and maintained at a high temperature sufficient to volatilize all of the known elements other than carbon, and for this purpose the well-known furnace used in the manufacture of carborundum may be employed, a body of the carbonaceous material to be treated being placed in such furnace around a central conducting-core, which, however, may with advantage be of less diameter than is preferably used in the carborundum-furnace. The ends of the core are connected with the usual electrodes and the current is passed through the same, raising the contents of the furnace to an intense heat and accomplishing the desired reactions in that portion of the charge lying near the core. The temperature which is attained is above the vaporizing-point of the contained impurities, for analysis shows that the ash content of the graphite is less than that of the anthracite or like material treated. Moreover, spectroscopic examination of vapors escaping during the operation show the presence of metals therein. In thus proceeding the heat which effects the conversion into graphite of the non-caking coal or other specified material, whether said heat be produced primarily in the conducting-core or primarily in the material to be converted, is generated electrically within the mass of said material, so that the vapors produced are those of substances forming part of the non-caking coal or other material above specified. I believe, however, that my present invention is the first to effect the conversion of said non-caking coal or other specified material in such substantial proportions as is essential to industrial working by the aid of the impurity naturally present in said coal or other specified material irrespective of the generation of the electrical heat within the mass of material to be converted. Moreover, it is a further advantage and special improvement to supply the electrical heat by the aid of a conductor of less resistance than the non-caking coal or other specified material and in contact therewith and formed best (although not necessarily to the exclusion of other materials) of graphite in a solid or loose condition. A conductor of this description is employed in the beforementioned carborundum-furnace. (See my Patent No. 492,767, dated February 28, 1893.) One advantage of this mode of electric heating is the facility which it affords for controlling the temperature. It also permits the heating action to be extended over a longer distance than would be practicable without its aid.

So far as I am aware all non-caking coal contains inherent impurities capable of forming carbids, but less in amount than enough to convert the whole piece into said carbids and naturally distributed with substantial uniformity in the piece; but whether so or not it must be understood that the non-caking coal of the hereinafter-written claims is intended to be of this description. It will be understood that the expression "non-caking coal" wherever it occurs in any of said claims is intended to include other like carbonaceous materials, as hereinbefore set forth.

What I claim is—

1. The method herein described of making graphite, consisting in treating an aggregation of pieces or particles of carbonaceous material of which the said pieces or particles respectively contain inherent impurities capable of forming carbids but less in amount than enough to convert the whole of the respective pieces or particles into said carbids and naturally distributed with substantial uniformity in the piece and which can be heated to a charring temperature without destroying the relative positions of the carbon and such associated impurities, by heating said material to a high temperature and continuing such heating until the individual pieces have been progressively converted into graphite in greater proportion than would be produced by decomposition of the relatively-small amount of fixed carbid capable of being formed by the impurities naturally present in said pieces, substantially as described.

2. The method herein described of making graphite which consists in heating to a high temperature while protected from atmospheric influence, an aggregation of pieces or particles of non-caking coal, of which the said pieces or particles contain inherent impurities capable of forming carbids but less in amount than enough to convert the whole of the respective pieces or particles into said carbids and naturally distributed with substantial uniformity in the piece and which can be heated to a charring temperature without destroying the relative positions of the carbon and such associated impurities, without previously changing the natural ash content thereof and thereby converting the pieces into graphite, substantially as described.

3. The method herein described of making graphite, which consists in heating non-caking coal, the pieces or particles of which contain inherent impurities capable of forming carbids, but less in amount than enough to convert the whole of the respective pieces or particles into said carbids and naturally distributed with substantial uniformity in the piece and which can be heated to a charring temperature without destroying the relative positions of the carbon and such associated impurities, to a high temperature by passing electricity through said coal and thereby generating electrically within the same the heat necessary for making the graphite, substantially as described.

4. The method herein described of making graphite, which consists in heating non-caking coal, the pieces or particles of which contain inherent impurities capable of forming carbids but less in amount than enough to convert the whole of the respective pieces or particles into said carbids and naturally distributed with substantial uniformity in the piece and which can be heated to a charring temperature without destroying the relative positions of the carbon and such associated impurities, to a high temperature by passing electricity through a conductor of less resistance than said coal, and in contact therewith, and thereby generating electrically by the aid of said conductor the heat necessary for making the graphite, substantially as described.

In testimony whereof I have signed my name to this specification in the presence of two subscribing witnesses.

EDWARD GOODRICH ACHESON.

Witnesses:
THOMAS W. BAKEWELL,
FRANK L. FREEMAN.